United States Patent [19]

Foreman

[11] 3,845,461
[45] Oct. 29, 1974

[54] INTRUSION DETECTION SYSTEM
[75] Inventor: Donald S. Foreman, Fridley, Minn.
[73] Assignee: Honeywell Inc., Minneapolis, Minn.
[22] Filed: June 25, 1973
[21] Appl. No.: 373,105

[52] U.S. Cl............. 340/1 R, 340/3 D, 340/258 A, 343/5 PD, 343/7.7
[51] Int. Cl. .......................................... G08b 13/16
[58] Field of Search....... 343/5 PD, 7.7, 8; 340/3 D, 340/1 R, 258 A

[56] References Cited
UNITED STATES PATENTS 3,703,722  11/1972  Gershberg et al. .............. 343/5 PD
3,781,773  12/1973  Ravas ................................. 340/1 R Primary Examiner—Richard A. Farley
Attorney, Agent, or Firm—Charles J. Ungemach; Albin Medved

[57] ABSTRACT

An improved intrusion detection system operating in either ultrasonic or electromagnetic wavelengths using a single transducer, which distinguishes between intruder movement toward the transducer or away from it, and gives no alarm unless intruder movement has a net component of approach or retreat.

6 Claims, 4 Drawing Figures

INTRUSION DETECTION SYSTEM

FIELD OF THE INVENTION

This invention relates to the field of intrusion detection and particularly to means for reducing the incidence of false alarms in intrusion detection systems.

It is frequently desirable to monitor sensitive areas so that presence of an intruder in the area may be detected. A known way of performing this function comprises transmitting energy into the area: the energy is reflected from bodies in the area, and if the bodies are all motionless, the reflected energy has the same frequency as that transmitted.

If a body in the area has a component of movement toward the transmitter the reflected energy frequency is higher than that transmitted and, conversely, if the body has a component of movement away from the transmitter the reflected energy frequency is lower than that transmitted, according to the well known Doppler principle. The most significant target to be detected in intrusion detection systems is that of a walking man. Practically, in order to discriminate against targets not of interest such as small animals up to the size of a cat, the maximum frequency of the transmitted energy is limited to a few hundred megacycles, for electromagnetic radiation. On the other hand the relative speed of a man is so slow that the Doppler frequency is too low for any practical filter circuitry unless the transmitted frequency is in the gigacycle range.

DESCRIPTION OF PRIOR ART

Circuitry has been developed which avoids this difficulty by not depending directly on determination of the Doppler frequency itself. (See "Microwave Intrusion Detection," pages 39–51 of *Security Electronics* by John Cunningham.) Such arrangements suffer from the defect that they are incapable of distinguishing between movements of a target toward them and away from them. In theory this may not be a critical matter, but in practical applications there are bodies in an area which may move slightly toward and away from the monitor, without any net motion-foliage acting under the influence of wind is an example. Prior art systems give the same sort of an output for both directions of motion of the foliage, and hence all such motions are reported as intrusions and hence become false alarms.

Apparatus as taught by Varian et al. U.S. Pat. No. 3,024,456 also attempts to distinguish the sense of target motion, but requires a pair of transducer elements, thus complicating the structure from the point of view of the designer.

SUMMARY OF THE INVENTION

My invention is arranged to give signals of opposite senses for opposite target motions with only a single transducer, so that when these signals are fed through an integrator, the integrated output represents solely target movement having a net component of approach (or departure), thus eliminating swaying foliage etc., as a cause for alarm signals.

My invention may be practiced by the use of either ultrasonic energy or electromagnetic energy. As used herein the term "transducer" is intended to include either a device for interconverting electric energy and sonic energy, or a device for intercoupling electrical circuitry, including waveguides and transmission lines, and free space. Similarly, the expression "radiated energy" is intended to include either electromagnetic or ultrasonic energy propagated in the area being monitored.

It is a principle object of my invention to provide a new and improved intrusion detection system. Various other objects, advantages, and features of novelty which characterize my invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

DESCRIPTION OF THE PREFERRED EMBODIMENTS

Figure 1:
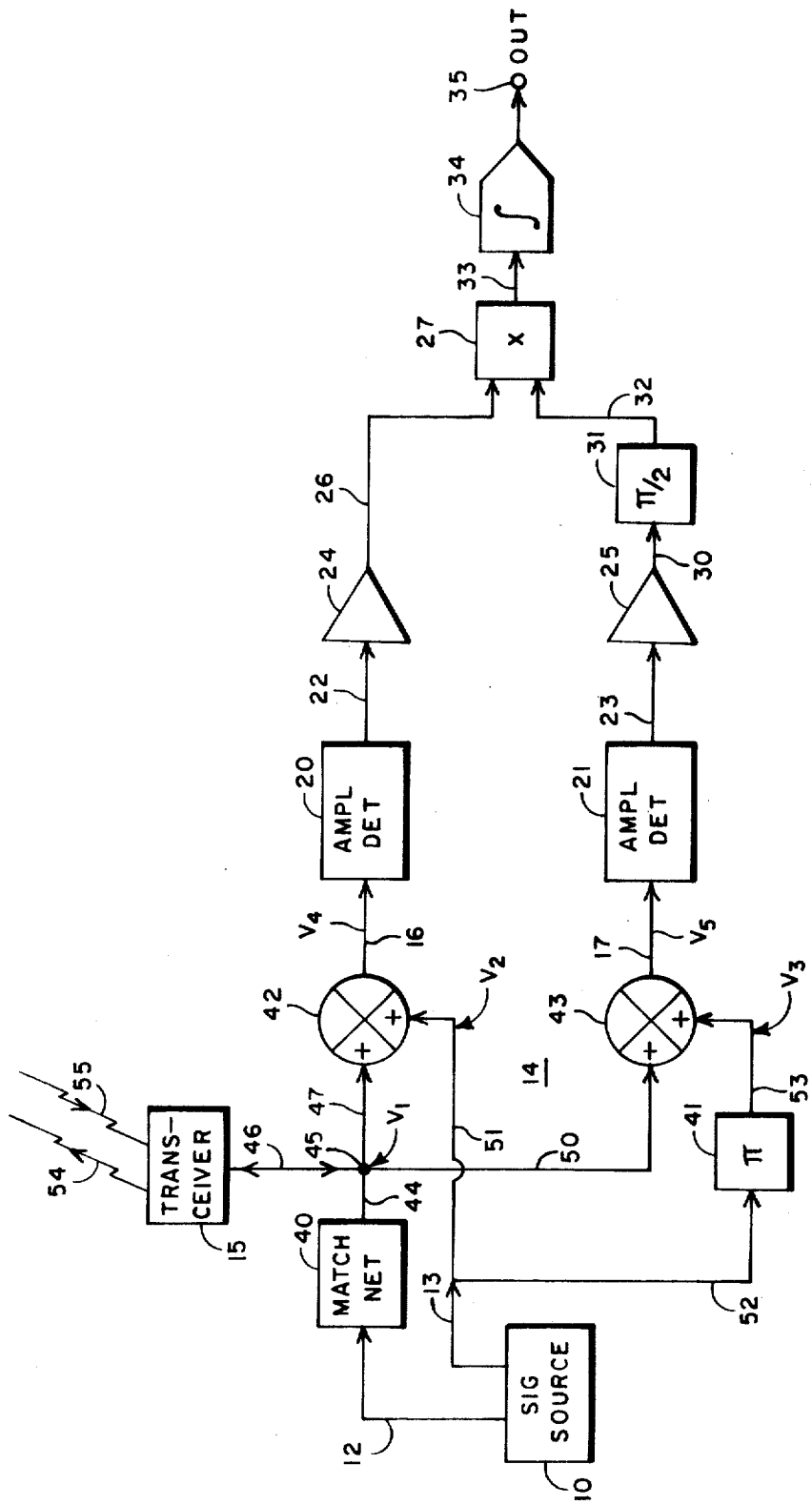
FIG. 1 is a generalized showing of my invention.

Referring now to FIG. 1, a signal source 10 is shown to supply two signals in quadrature at 12 and 13 to a system or network generally identified by the reference numeral 14. System 14 energizes and is energized by a transducer 15, and supplies outputs at 16 and 17 to a pair of amplitude detectors 20 and 21, and then at 22 and 23 to amplifiers 24 and 25, all respectively. The output 26 of amplifier 24 is supplied directly to a multiplier 27: the output 30 of amplifier 25 is supplied to multiplier 27 through a phase shifter 31 at 32. Then output 33 of multiplier 27 is fed to an integrator 34 having an output connection 35.

System 14 comprises a matching network 40, a phase reverser 41, and a pair of summing networks 42 and 43. Signal 12 from source 10 is fed through network 40 and conductor 44 to a summing point 45, which is connected to transducer 15 by conductor 46, and to summing networks 42 and 43 by conductors 47 and 50 respectively. Signal 13 from source 10 is fed through conductor 51 to summing device 42, and through conductor 52, phase referser 41, and conductor 53 to summing network 43. The outputs of networks 42 and 43 comprise inputs 16 and 17 to the amplitude detectors.

Transducer 15 may be for example a microwave, VHF, or UHF antenna, or an ultrasonic transducer: it radiates energy at 54 into the space circumambient thereto, and receives at 55 energy reflected from bodies in that space. It has been found, and can be shown mathematically, that the output of multiplier 27 is of one sense when signal 54 is reflected at 55 from a body moving toward transducer 15, and of the opposite sense if the body is moving away from the transducer. The effect of integrator 34 is essentially to cancel out any signals due to reflections from bodies having no net movement toward or away from the transducer, such as swaying foliage or falling objects, so that a signal appears at terminal 35 only when a body in the space has a continuous component of motion toward or away from the transducer.

Figure 2:
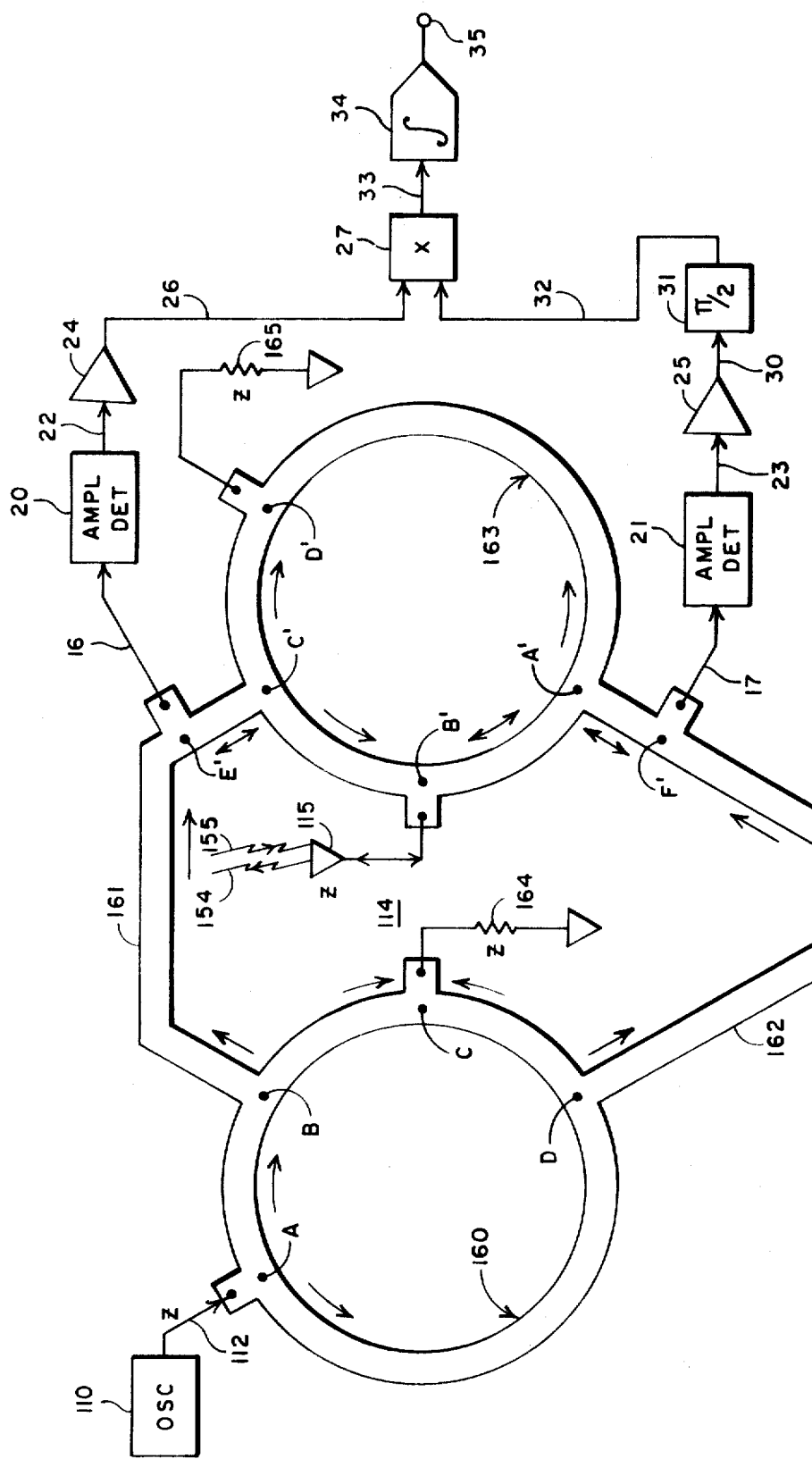
FIG. 2 shows a first embodiment of the invention operating in the microwave, VHF, or the UHF region.

FIG. 2 shows a practical embodiment of the invention for use at microwave or UHF frequencies. Here amplitude detectors 20 and 21, amplifiers 24 and 25, phase shifter 31, multiplier 27, integrator 34, and their connections function as described above. An oscillator 110 supplies microwave or UHF energy at 112 to a system 114 comprising a first hybrid junction or ring 160 connected by transmission lines 161 and 162 to a second hybrid junction 163. The junctions are connected to ground by terminating impedances 164 and 165 respectively, and junction 163 is connected to an antenna 115. The impedances of various components must of course be properly matched to avoid standing waves.

Points in the transmission line system have been given identifying letters in FIG. 2. The distances AB, BC, CD, A'B', B'C', and C'D' are all $\lambda/4$ where $\lambda$ is the wavelength of oscillator 110. Distances AD and A'D' are both $3\lambda/4$. The distances A'F' and C'E' are equal at some value $d$. The distance DF' must be $\lambda/4$ longer or shorter than the distance BE'.

Figure 3:
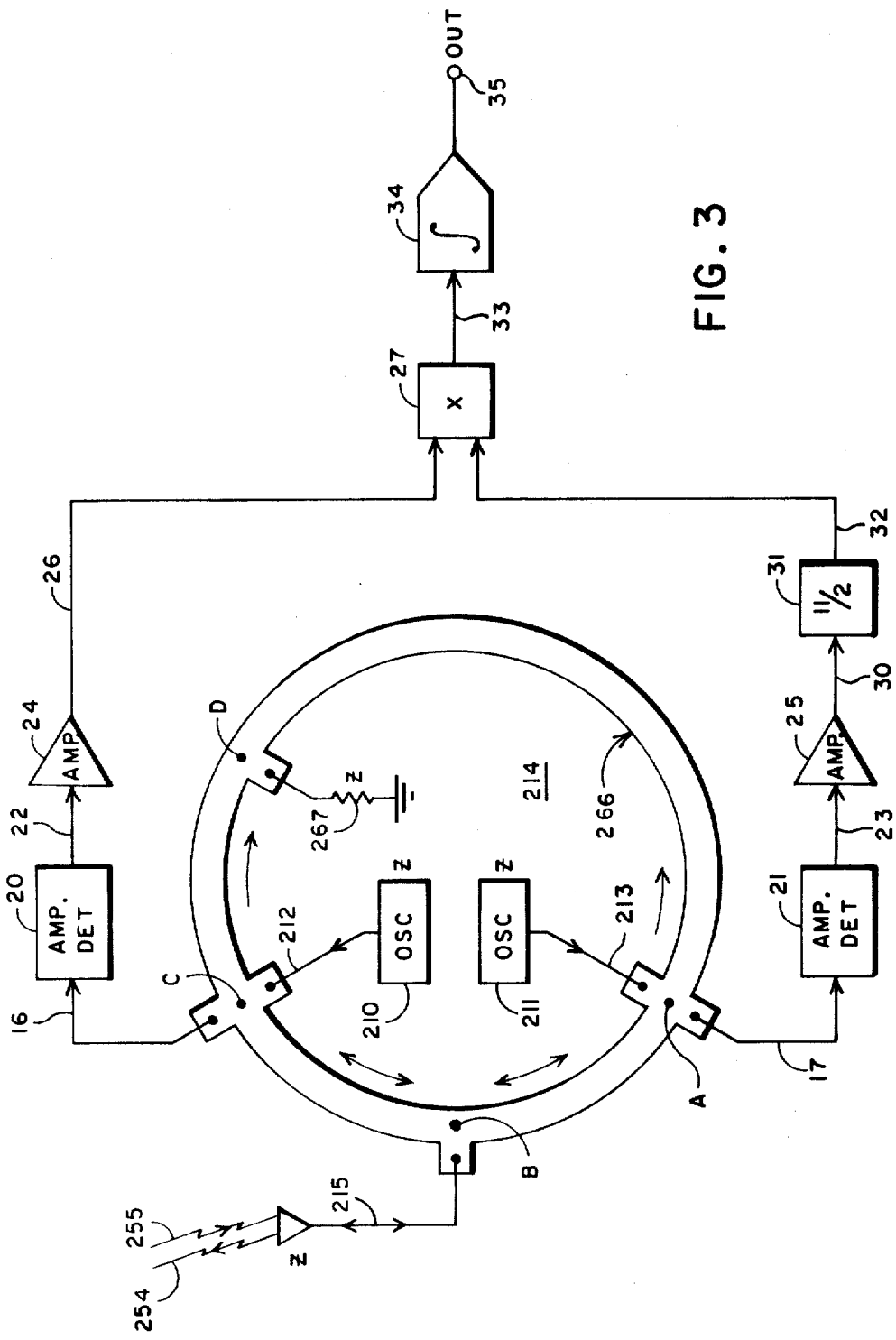
FIG. 3 shows a second embodiment of the invention operating in that region.

FIG. 3 shows a system very like that just described, except that the transmission line system 214 used is a single hybrid junction or ring energized by two signals having the same frequency and in quadrature phase relationship. Here detectors 20 and 21, amplifiers 24 and 25, phase shifter 31, multiplier 27, and integrator 34, and their connections function as described above. Points in the transmission line system are again identified by letters, distances AB, BC, and CD are equal to $\lambda/4$, and distance AD is equal to $3\lambda/4$. First and second oscillators 210 and 211 supply signals in quadrature at 212 and 213 to points A and C of hybrid junction 266, the rat race. An antenna 215 is connected at point B, and a terminating impedance 267 is connected at point D. Amplitude detectors 20 and 21 are connected to points C and A. Impedence matching is again required.

The structures of FIGS. 2 and 3 function as described in connection with FIG. 1 to give integrator outputs only when a body moving in the space circumambient to antenna 115 or antenna 215 makes net progress toward or away from the antenna.

Figure 4:
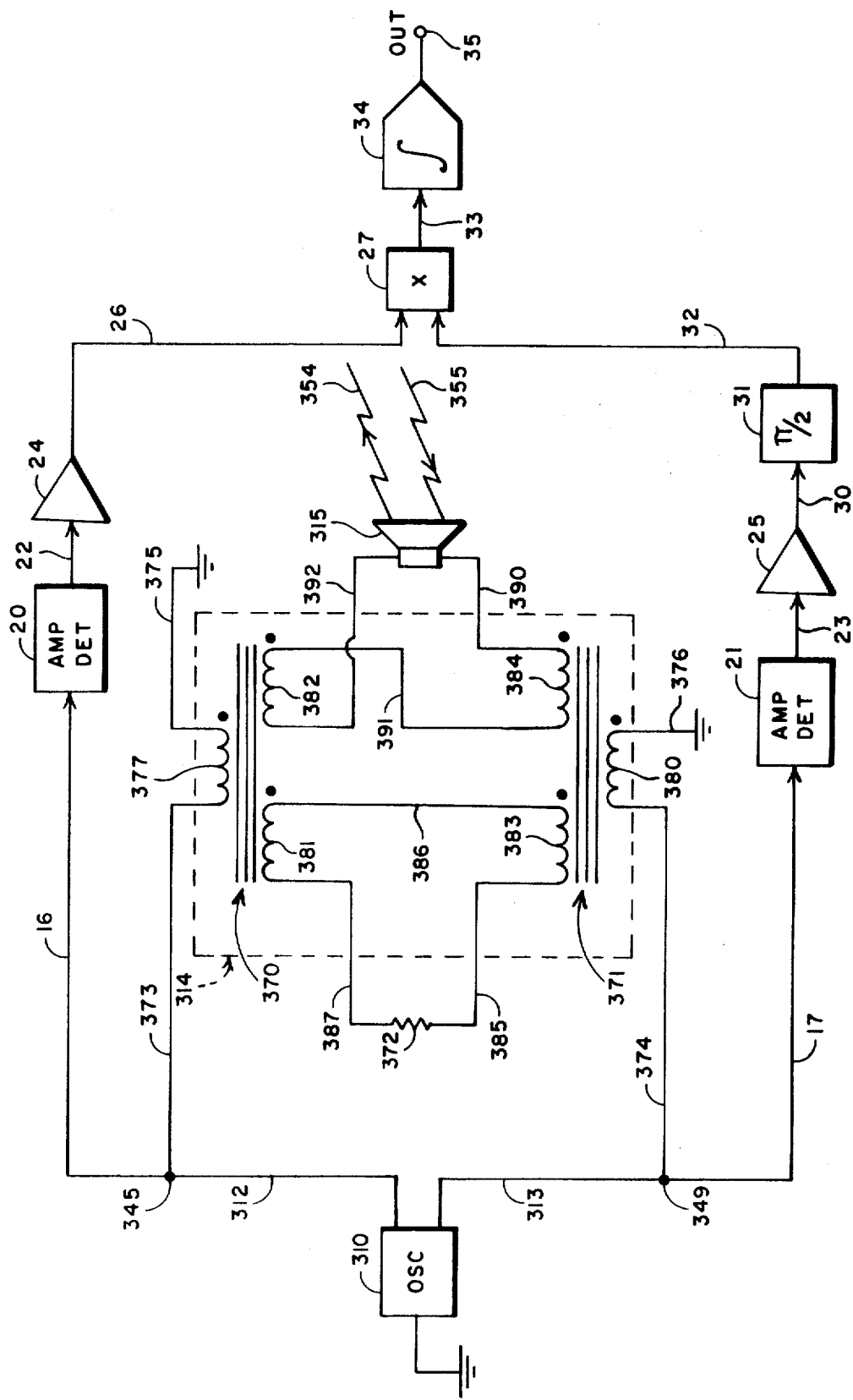
FIG. 4 shows an embodiment of the invention operating in the ultrasonic region.

FIG. 4 shows an ultrasonic oscillator 310 to supply a pair of signals in quadrature relationship at 312 and 313 to junction points 345 and 349 of a system 314 including a pair of transformers 370 and 371 and a resistor 372. The input signals are supplied by conductors 373 and 374 and ground connections 375 and 376 to first windings 377 and 380 of transformers 370 and 371, which have further windings 381 and 382, and 383 and 384, all respectively, poled as indicated by the conventional showing of dots in the figure. Windings 381 and 383 are connected in series with resistor 372 by conductors 385, 386, and 387. Windings 382 and 284 are connected in series with transducer 315 by conductors 390, 391 and 392.

Amplitude detectors 20 and 21, amplifiers 24 and 25, phase shifter 31, multiplier 27, and integrator 34, and their connections, function as described above, the amplitude detectors being connected at 16 and 17 to junction points 345 and 349.

It is to be noted that my invention requires only a single antenna or transducer to function properly, thus clearly distinguishing it from prior known systems such as that taught for example in Varian et al. U.S. Pat. No. 3,024,456.

The figures, description, and drawing are illustrative of my invention, which I now claim as follows:

1. Apparatus for indicating the presence in a monitored space of a body having a component of movement toward or away from the indicating apparatus comprising, in combination:
 a single transducer operable to transmit radiated energy into a space and to receive said radiated energy when reflected from bodies in said space;
 a source of radiated energy;
 means interconnecting said source and said transducer so that energy from said source may be transmitted into said space and may also combine with reflected energy from said space to comprise a first signal having a first component determined by said source and a second component determined by the movement of any reflecting body in the space;
 detecting means connected to receive said first signal for giving a pair of further signals, in phase quadrature, in response to said component of movement of said body in said space, the phase relation therebetween reversing with reversal in the sense of said component; and
 means for deriving from said further signal an output which reverses with reversal of the phase relation therebetween.

2. Apparatus according to claim 1 in which the interconnecting means includes a hybrid junction energized from said source with two signals in phase quadrature.

3. Apparatus according to claim 2 in which said hybrid junction comprises a hybrid coil and said transducer converts electrical energy to acoustical energy.

4. Apparatus according to claim 2 in which said hybrid junction is a rat race and said transducer is a microwave or UHF antenna.

5. In combination:
 a hybrid junction having first and second mutually decoupled arms which are severally coupled to a third arm;
 means coupling power to said first and second arms in phase quadrature;
 transducer means coupled to said third arm to emit power coupled from said first and second arms and to accept power impinging thereon for coupling to said first and second arms;
 amplitude detectors connected to said first and second arms respectively;
 multiplying means for giving an output representative of the products of two inputs thereto;
 means connecting said detectors to supply the inputs to said multiplying means, one of the connecting means including a phase shifter; and
 integrating means connected to receive the output of said multiplying means 6. In combination:
 a hybrid coil having first and second mutually decoupled windings which are severally coupled to a third winding;
 means coupling alternating electric currents of ultrasonic frequency to said first and second windings in phase quadrature;
 transducer means coupled to said third winding to emit ultrasonic acoustic power coupled from said first and second windings and to accept power for coupling to said first and second windings;

amplitude detectors connected to said first and second windings respectively;

multiplying means for giving an output representative of the product of two inputs thereto;

means connecting said detectors to supply the inputs to said multiplying means, one of the connecting means including a phase shifter; and integrating means connected to receive the output of said multiplying means.

* * * * *